Aug. 2, 1966  R. C. PARKINSON ET AL  3,263,504
MINIATURE ACCELEROMETER

Filed Aug. 23, 1961  3 Sheets-Sheet 1

INVENTORS
ROBERT C. PARKINSON
GEORGE J. BROWN
BY ARTHUR A. ZUEHLKE

INVENTORS
ROBERT C. PARKINSON
GEORGE J. BROWN
BY ARTHUR A. ZUEHLKE

Aug. 2, 1966  R. C. PARKINSON ET AL  3,263,504
MINIATURE ACCELEROMETER
Filed Aug. 23, 1961  3 Sheets-Sheet 3
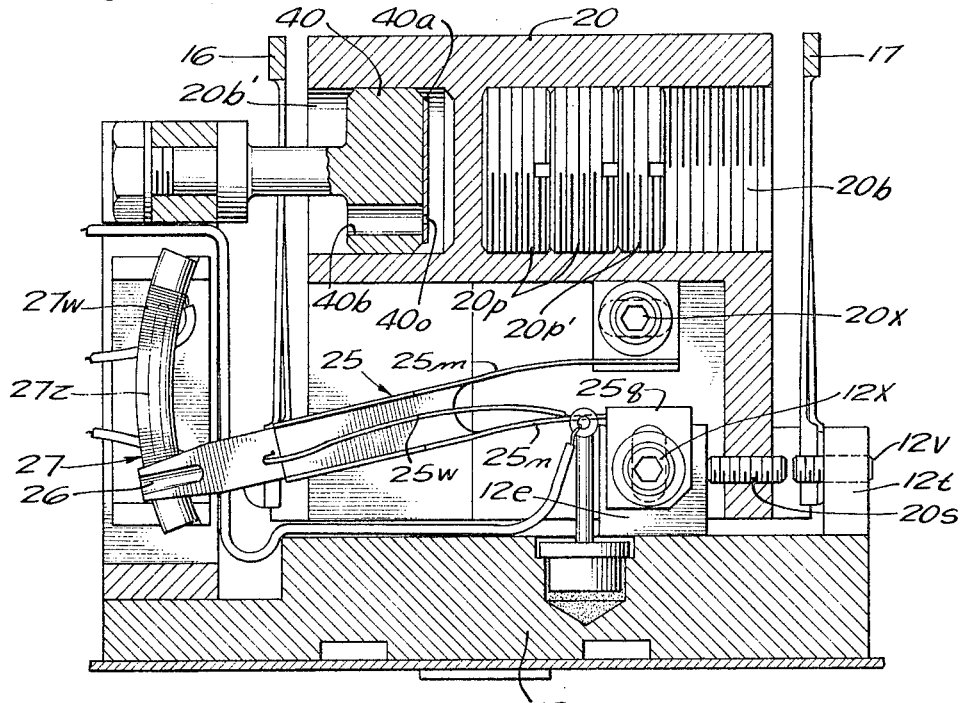
FIG. 6.
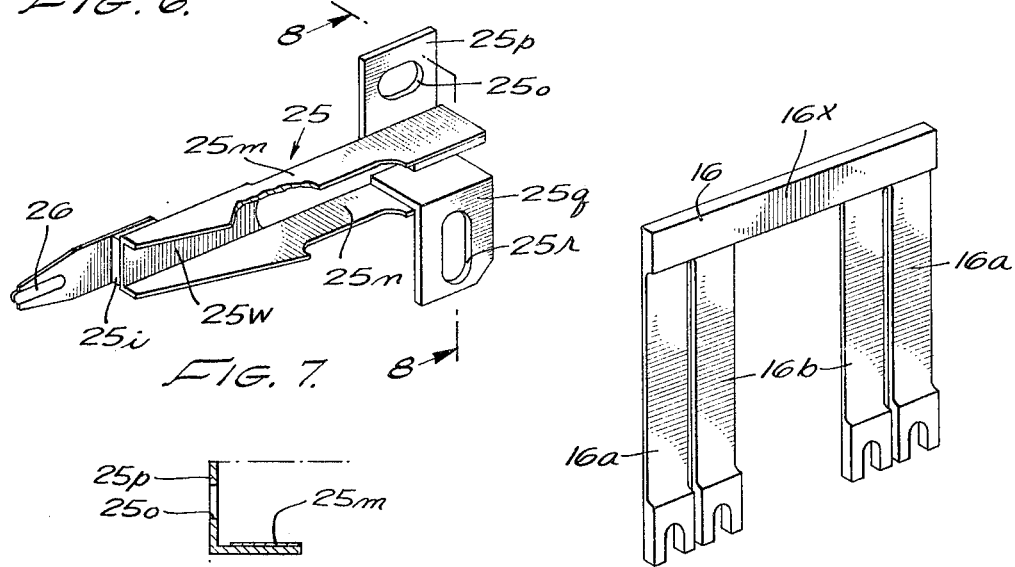
FIG. 7.
FIG. 8.
FIG. 9.
INVENTORS
ROBERT C. PARKINSON
GEORGE J. BROWN
BY ARTHUR A. ZUEHLKE
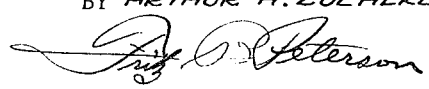

United States Patent Office 3,263,504
Patented August 2, 1966

3,263,504
MINIATURE ACCELEROMETER
Robert C. Parkinson, George J. Brown, and Arthur A. Zuehlke, Riverside, Calif., assignors to Bourns, Inc.
Filed Aug. 23, 1961, Ser. No. 133,518
11 Claims. (Cl. 73—515)

This invention pertains to linear acceleration-sensing and indicating instruments (commonly called accelerometers), and more particularly to improvements in miniaturization, motion-damping, and increasing natural frequency of supported-mass means in such instruments.

Since the natural frequency of an accelerometer may be mathematically expressed by the equation:

$$f_n = \frac{3.14}{(\Delta IG) \cdot 5} \quad (I)$$

wherein $f_n$ is the natural frequency and $\Delta IG$ is the mass movement per unit of acceleration equated to the acceleration due to gravity ($g$), it is evident that the natural frequency is increased as the mass movement per unit of acceleration is decreased. That fact presents rather serious obstacles to production of a satisfactory small supported-mass (suspended-mass) acceleration-sensing instrument, because in limiting the movement of the mass to increase the natural frequency (which is extremely desirable for obvious reasons), there is introduced the problem of translating the small amount of movement into an adequate range of change of indication (for example, an adequate range of motion of the movable contact of a potentiometer). Further, reduction of size or of mass-motion per $g$ of acceleration introduces very serious consequences in respect of damping undesired oscillation of the mass, since as the mass is reduced any damping characteristic change that is caused by temperature and/or damping-fluid viscosity changes is magnified, with consequent detrimental effects upon the accuracy of the indications furnished by the instrument.

The present invention, by utilizing a unique means and principle for damping movements of the suspended mass, by utilizing a special means for mounting the mass for very small movement per $g$ of acceleration, and by using a special motion-amplifying means to translate motion of the mass to the movable element of an electrical indicator device with no lost motion, provides a solution for the previously mentioned difficulties. Thus in accord with the principles of the invention and as illustrated in the preferred exemplary embodiment of apparatus hereinafter described and explained, a relatively small mass is supported by and constrained to straight-line motion by a pair of stiff spring devices and has its movements damped by the resistance of a body of damping fluid to acceleration through a small sharp-edge orifice whereby variations in damping due to change of fluid viscosity incident to temperature changes are obviated. Also, movement of the mass, restricted to small values by the relatively high spring-constant/mass ratio employed, is amplified by a unique motion-multiplying means and applied to the wiper-contact of a potentiometer with no lost motion, whereby the contact moves many times the distance moved by the mass and resolution of the electrical indication is greatly improved. The motion of the mass is in effect amplified or multiplied by connecting one limb of a pair of divergent but integrally-connected pair of resilient flexible limbs to the mass and the other limb to relatively stationary structure, as will presently be more fully described.

The preceding brief discussion and description of the invention makes it evident that it is a primary object of the invention to provide improvements in linear or uniaxial acceleration sensors.

Another object is to provide an acceleration-sensing-and-indicating instrument characterized by high natural frequency and small size.

An additional object of the invention is to provide an accelerometer characterized by high natural frequency and by excellent electrical resolution of the acceleration-indicating or signaling means.

Another object of the invention is to provide a suspended-mass accelerometer characterized by relatively small mass movement and very fine resolution of the electrical indication of the movement of the mass under mass-accelerating influences.

Other objects and advantages of the invention will hereinafter be made apparent in the appended claims and in the description of a preferred exemplary physical instrument embodying the principles of the invention. The exemplary instrument is illustrated in the accompanying drawings, in which:

FIG. 6 is a sectional view similar to FIG. 5, but illustrating parts with the instrument subjected to acceleration in the opposite direction;

FIG. 7 is an oblique view of the motion-amplifying or motion-multiplying contact-carrying wiper arm with a portion broken away to reveal details;

FIG. 8 is a sectional view taken as indicated in FIG. 7; and

FIG. 9 is an oblique or pictorial view of a mass-supporting spring device.

Figure 1:
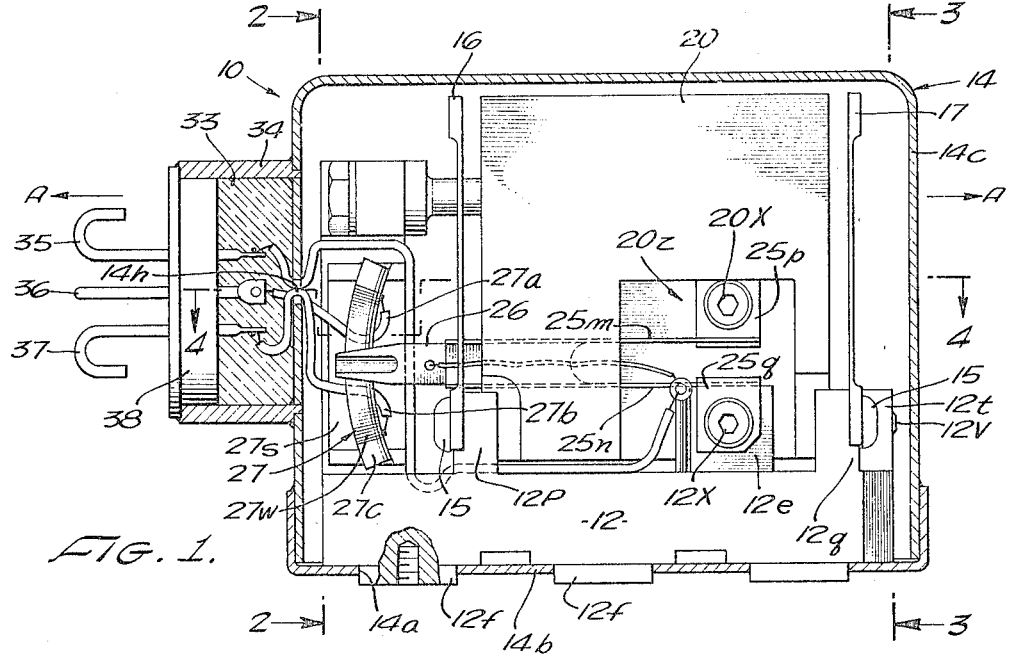
FIG. 1 is a view of the instrument, partly in section and with parts broken away to better show details.
Figures 2, 3:
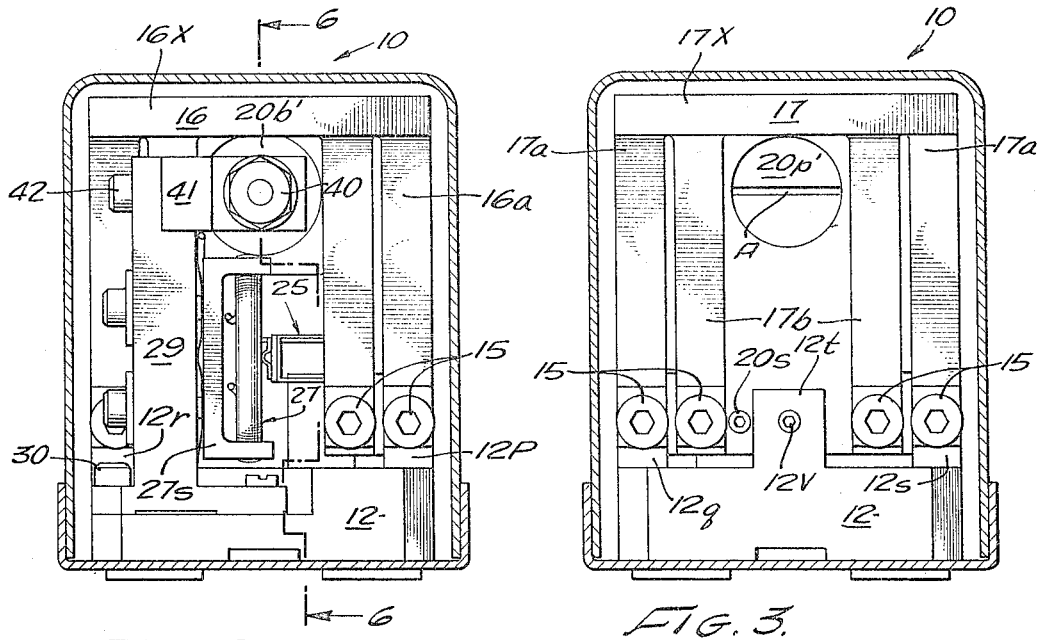
FIG. 2 is a view in section, taken along a plane indicated by line 2—2 of FIG. 1, with parts removed for clarity of disclosure.
FIG. 3 is a sectional view of the instrument taken as indicated by line 3—3 of FIG. 1.
Figure 4:
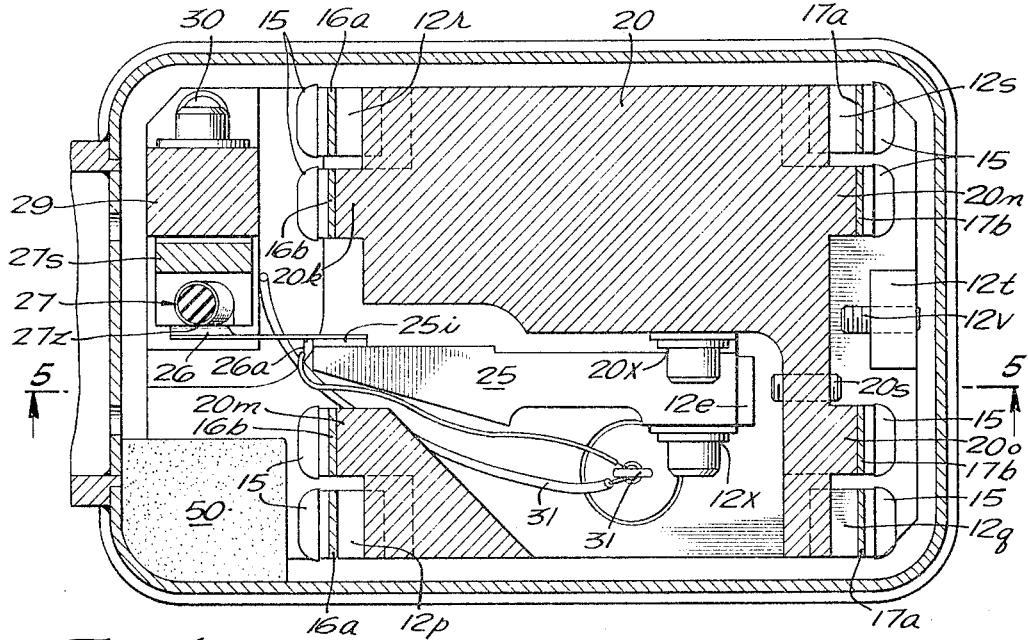
FIG. 4 is a transverse sectional view of the instrument, viewed downwardly, and on a slightly larger scale, illustrating the spatial disposition of the spring-suspended mass and the electrical indicating means, with parts removed.
Figure 5:
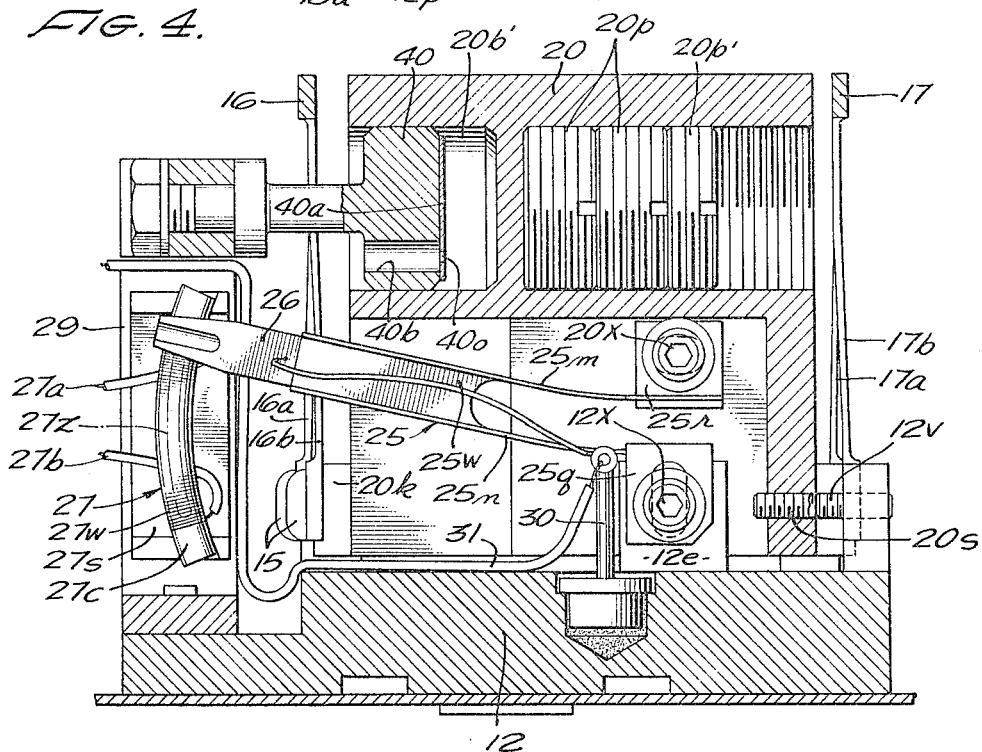
FIG. 5 is a sectional view taken as indicated by line 5—5 of FIG. 4, but with the instrument subjected to acceleration.

Referring first to FIGS. 1-3, the exemplary instrument designated generally by ordinal 10, comprises a rigid plate-like base or frame 12 having depending feet 12f positioned to extend through complementary close-fitting apertures 14a formed in the base 14b of a can or casing 14 which forms a housing in which the operating parts of the instrument are sealed. An appropriate number of feet 12f are provided, and one or more may be bored and tapped as indicated in FIG. 1, whereby the instrument may be securely and easily attached to the structure whose acceleration is to be sensed. The casing base 14b may be sealed at apertures 14a, as by brazing around the peripheries of feet 12f. Casing 14 also comprises a can-like cover 14c which, following final assembly, adjustment, and inspection of the instrument, may be sealed to base 14b as by welding. Frame 12 further comprises four upstanding pedestals 12p, 12q, 12r and 12s serving to support the outer struts 16a, 17a of first and second substantially identical mass-supporting spring devices 16 and 17 respectively (see FIG. 9 for details of the spring devices). Thus struts 17a are secured at their lower ends by screws 15 to pedestals 12q and 12s, respectively, as indicated in FIGS. 3 and 4; and struts 16a are similarly secured to pedestals 12p and 12r as indicated in FIGS. 2 and 4. The outer struts 16a and the inner struts 16b are interconnected by, and are preferably integral with, a bridge 16x (FIG. 9); and a similar construction is true of spring device 17, with appropriately changed ordinals for the bridge and limbs. Disposed between the upstanding spring devices, and supported thereby, is an inertial mass 20 (FIG. 1) that is formed with two sets (four) of outwardly protruding bosses, 20k, 20m, 20n and 20o (FIG. 4), to one of which sets (20k, 20m) are secured by screws 15 the lower ends of inner struts 16b of spring device 16, and to the other of which sets of bosses (20n, 20o) are secured by similar screws the lower ends of inner struts 17b of spring device 17. As may be determined or verified by examination of FIGS. 4, 5 and 6, the mass 20 is thus constrained, relative to frame 12 and casing 14, to straight-line (rectilinear) motion in either direction along an imaginary axis indicated by line A—A in FIG. 1; and is supported in a neutral attitude indicated in FIGS. 1 and 4 when the casing is not subjected to acceleration in the direction of the axis. The upper ends or bridges 16x, 17x of the spring devices partake of substantially linear up-and-down motion incident to back-and-forth motion of mass 20 in the direction of axis A—A, the struts 16a and 17a flexing in a sense opposite to that of the flexing of struts 16b and 17b, as is indicated in FIGS. 5 and 6. As indicated, the lower end of one set of limbs of either of the spring devices is fixed to the frame, and the lower end of the other set of limbs of either of the spring devices is secured to the mass. Hence the mass does not partake of any up-and-down movement, but moves only rectilinearly. While two limbs are shown in each set of limbs in each of the spring devices, the sets obviously may each comprise one limb only or some other number of limbs. In FIG. 5 the mass 20 is depicted as moved to the right relative to base 12 and casing 14 (incident to acceleration of the casing to the left); and in FIG. 6 to base 12 and casing 14, incident to acceleration of the casing to the right in the drawing. The extent of the relative displacement of mass 20 from the neutral position (relative to the base 12) is limited in a manner and by means presently to be described.

Base 12 is provided with a fifth upstanding pedestal, 12e (FIGS. 1, 4 and 5), that preferably is integral with the base, and which pedestal serves the dual function of providing an abutment for engagement by a motion-limiting stop screw 20s (FIGS. 3, 4 and 5) carried by mass 20, and of providing a fixed anchorage for one end of a flexible-limbed wiper arm or device 25 that is used to produce an electrical indication of any movement of mass 20 relative to base 12. The wiper device 25 (shown detached in FIG. 7) comprises two resilient leaf-spring limbs 25m, 25n that are connected by and preferably are integral with a connecting web 25w. Limb 25m is formed with or secured (as by spot welding) to a bracket 25p having an elongate aperture 25o therein; and limb 25n is similarly formed with or secured to a bracket 25q having an elongate aperture 25r therein, the apertures being thus formed or shaped to permit presently described adjustments of the limbs to be made. Lower limb 25n is adjustably affixed or secured to the aforementioned pedestal 12e by screw-and-washer means 12x; and upper limb 25m is adjustably affixed or secured to mass 20 by screw-and-washer means 20x. It may be noted that the direction of adjustment of the upper limb is horizontal and that of the lower limb is vertical, as viewed in FIGS. 1, 5 and 6.

As may be discerned by examination and comparison of FIGS. 1, 5 and 6, the limbs of wiper device 25 are substantially non-flexed when the inertial mass 20 is in neutral attitude or position relative to the base 12 (FIG. 1), but upon movement of mass 20 to the right relative to base 12 from neutral position (as in FIG. 5), upper limb 25m is drawn to the right and both limbs are flexed upwardly since lower limb 25n cannot move to the right. Similarly, upon movement of mass 20 to the left from neutral position, upper limb 25m is pushed and both limbs flex downwardly (FIG. 6). The construction of device 25 is preferably such that the limbs are at least slightly divergent, as viewed from web 25w, at all possible adjustments. It is apparent that the action of the device 25 is in effect an amplification or multiplication of the motion of mass 20 relative to base 12, and a translation of that motion to a substantially arcuate or rotary motion (of the web end of the device 25) transversely of the linear motion of the inertial mass. It also is evident that the degree of amplification is dependent upon the lengths of the flexible limbs of device 25, and that the amplification ratio may be changed or adjusted by appropriate adjustment of bracket 25q relative to pedestal 12e. For example, adjustment of bracket 25q downwardly, increasing the spacing of the brackets 25p, 25q, decreases the motion-multiplication factor or ratio; and adjustment upwardly increases the amplification.

The arcuate or swinging motion of wiper device 25 is used to move one electric signaling means relative to another to produce an electrical signal indicative of the direction and extent of movement of base 12 relative to mass 20. In the illustrated exemplary apparatus, device 25 carries at its extremity an electrical brush or contact 26 that is preferably insulated from the conductive portions of the device by an insulator 25i. Contact 26, insulator 25i and web 25w may be secured together by any suitable means, such as insulated rivets or eyelets, or adhesive means. Contact 26 is arranged for coaction with a second electrical signaling means, the latter in the illustrated example being a resistance element 27. Element 27 (FIG. 5) is constructed and disposed with an exposed conductive area or surface 27z positioned to be brushed or wiped by contact 26 as the latter is moved incident to flexure of limbs 25m, 25n; and the element may be a wirewound resistor comprising an appropriately shaped mandrel or core 27c and a winding of resistance wire 27w thereon, or the element may be a composition element of known construction. The element is adjustably positioned in slots formed in the end flanges of a support 27s; and is held in the position selected by suitable means, such as screws, or by adhesive. Support 27s is affixed to an upstanding rigid column 29 (FIG. 2) by screws (not shown) or other suitable means such as adhesive, either means being such as to permit adjustment of the element relative to the neutral position of wiper device 25. Column 29 is affixed at its foot to base 12 by suitable means such as screw means 30 (FIGS. 2 and 4). Suitable insulated electric terminations of leads, 27a, 27b are electrically connected (as by welding) to respective end portions of element 27; and an insulated lead 26a is connected to contact 26 (see FIG. 4) and to a binding post 30 to which an insulated extension or termination lead 31 is connected as shown in FIG. 5. The leads or terminations, 27a, 27b and 31, extend through an aperture 14h in casing-top 14c (see FIG. 1); and the several leads may either extend through a mass of sealant (shown as transparent potting compound 33 disposed in a cup 34); or the leads may be connected to respective ones of suitable terminals such as sealed J-lugs 35, 36 and 37 that are insulatively sealed to a cap 38 and which is sealed to cup 34 with or without compound 33 according to design requirements. Thus it is evident that brushing movement by contact 26 along an extent of the exposed surface of element 27 causes a change in the electrical resistance exhibited between either of leads 27a, 27b and lead 26a; and that thereby an accurate electrical indication of the extent of motion of contact 26 (and hence also the extent of motion of mass 20 relative to base 12) is furnished or provided. Also, when a source of electric power or current is connected to any two or more of the leads, or to terminals (lugs) 35, 36 and 37, an electrical signal is produced in the form of a potential change or current change when movement of contact 26 relative to element 27 occurs, the signal being representative of the axial acceleration causing the movement of the contact 26.

The extent of motion of inertial mass 20 relative to base 12 when the base is subjected to accelerating forces in the direction of axis A—A, is dependent, inter alia, upon the magnitude of mass (weight) comprised in inertial mass 20, and the spring constant of the combination of spring devices 16 and 17 acting in unison. Those structures accordingly may vary dimensionally and as to composition in accord with known design principles, to accommodate a specified range of accelerations, within the set limits of movement of the mass relative to the base 12. As previously indicated, relative motion of mass 20 to the left (as viewed in FIGS. 4, 5 and 6), from the neutral attitude, is limited by engagement of the previously mentioned stop screw 20s (FIG. 6) with a face of pedestal 12e. Stop screw 20s, as noted, is carried by mass 20, and pedestal 12e is part of base 12. As is evident, the extent of relative motion to the left that is permitted may be varied, and fixed at a desired value, by appropriate adjustment of screw 20s.

Permitted motion of mass 20 to the right relative to base 12 (as viewed in FIG. 5) is limited by engagement by an end face of the mass 20 with an adjustable stop screw 12v (FIGS. 3 and 4) that is threaded into a tapered hole extending through a sixth upstanding pedestal 12t. (See also FIG. 6.) As may be discerned by examination of FIG. 3, pedestal 12t is sufficiently narrow to provide access to the outer end of the other stop screw 20s, whereby the latter may be adjusted.

Access to screw-and-washer means 12x and 20x, that serve to support the limbs of the wiper device 25, is provided by a notch or cut-out 20z (FIG. 1) formed in one side of the mass 20. Adjustment of the physical value of mass of the inertial mass 20, whereby compensation may be made in the spring/mass relationship, is effected by inserting and/or removing small threaded plugs 20p (FIG. 6) that are received in a tapped bore 20b formed in mass 20 and held securely in position therein by a tightly fitting plug 20p'. Plugs 20p may be formed of various sizes and of materials of various densities, as is evident to those skilled in the art. Since the mass 20 is quite securely restrained from transverse movement (upward, downward, sideward) relative to base 12, the actual location of plugs 20p is of no consequence as long as they are during operation immobile relative to the mass 20.

To damp undesired oscillation or movements of mass 20 relative to base 12, a special damping means is provided which furnishes damping that is substantially free of variation as the environmental temperature and the viscosity of the damping fluid vary over wide ranges. The damping means is of the general character of a dashpot device, using a special orifice whereby changes of viscosity of damping fluid with changes of fluid-temperature are of no consequence. The damping means comprises a piston 40 (FIGS. 2 and 6) securely affixed to an outstanding bracket 41 that is either formed integral with, or, as shown, affixed to, the aforementioned upstanding column 29 as by screw means 42; and the piston is received in a complementary axially-aligned bore 20b' provided in mass 20 as clearly indicated in FIGS. 5 and 6. Piston 40 is provided with a bore 40b through its head, and that bore is covered at the inner face of the piston by a rigid thin disc 40a that is secured to the piston head (as by welding) and which disc is provided with a small sharp-edge aperture or orifice 40o that is substantially aligned with the axis of bore 40b. In accord with theoretical considerations explained in copending application for U.S. Letters Patent Serial No. 105,051, filed April 24, 1961, and the pertinent disclosure of which is herein incorporated by reference, the acceleration of damping fluid through orifice 40o is substantially independent of changes of viscosity incident to changes of temperature within wide ranges of temperature. As the instrument is assembled, bore 20b' is filled with damping fluid, piston 40 is inserted, the piston is secured to the bracket and the latter is secured to column 29, whereby fluid is maintained on both sides of orifice 40o during instrument adjustment and during application of the cover member 14c of the casing. A suitable damping fluid is silicone oil of low viscosity. With the casing cover 14c sealed to lower section 14c and with a compressible mass 50 or block of synthetic-resin foam (FIG. 4) in place within the casing, the latter is filled with damping fluid and the terminal leads potted or terminated and the instrument sealed off.

The preceding descriptions and explanations make evident the fact that by using a small mass and a small mass-movement per unit of acceleration (high spring constant), an exceptionally small instrument with a high natural frequency is obtained, with the very small total relative movement of mass compensated by a movement-amplifying means which is accurate because of complete absence of lost motion; that by amplification of the very small movement of the inertial mass relative to the base the resolution of the instrument is relatively high, that by the unique spring structure the inertial mass is strictly constrained to rectilinear motion relative to the base whereby any inaccuracy that would otherwise be introduced due to nonaxial accelerations is obviated; that due to the employment of a small sharp-edge orifice through which damping fluid is accelerated incident to motion of the inertial mass relative to the base the gross inaccuracies that would otherwise be introduced in an instrument of such small dimensions and weight, incident to changes of damping-fluid viscosity caused by temperature changes, are substantially completely obviated; and that the aforestated and other evident objects of the invention have been fully attained. Also, with the foregoing description and explanation of a preferred exemplary physical embodiment of an instrument according to the invention in view, changes and modifications thereof within the true scope and spirit of the invention will occur to those skilled in the art; and accordingly it is not desired to be restricted to the exact details of the exemplary instrument, and we claim:

1. A compact acceleration sensor instrument comprising:

first means, comprising base means, constructed and arranged to be subjected to acceleration;

second means, comprising inertial-mass means of generally rectangular parallelepiped external configuration and resilient means including first and second spring devices each having two pairs of limbs each pair of which is spaced-apart from the other pair to provide an intervening space, and each said spring device having a respective integral bridge portion interconnecting the limbs thereof and each said device being of length substantially equal to the height of said mass means and connecting the inertial-mass means at opposite ends thereof to said first means and constraining the inertial-mass means to rectilinear motion relative to said base means;

third means, comprising indicating means comprising a relatively fixed signaling element connected to said first means and a movable arm cooperating with said element and connected to said inertial-mass means and said indicating means having first and second spaced-apart convergent leaf-spring limbs and means rigidly uniting the limbs adjacent the convergent ends thereof, the unbridged end of the first of said leaf-spring limbs being secured to move with said inertial-mass means and the unbridged end of the second leaf-spring limb being secured to remain relatively fixed with said base means whereby said limbs are flexed and said arm is moved relative to said first means incident to to-and-fro movement of said inertial-mass means relative to said base means to produce a physical indication of rectilinear motion of said inertial-mass means relative to said base means; and fourth means, comprising sharp-edge orifice dashpot motion-damping means including damping liquid and means for confining about the dashpot means a supply of the liquid, said motion-damping means being constructed and arranged to damp relative motion of said inertial-mass means relative to said base means uniformly in both directions of said rectilinear motion irrespective of changes of viscosity of said damping fluid.

2. An instrument according to claim 1, said movable arm and said leaf-spring limbs being integral and said arm including a transverse web-portion interconnecting and spacing extensions of said first and second leaf-spring limbs.

3. An instrument according to claim 2, said arm including a means selected from variable resistance element means and variable resistance contact means.

4. For an acceleration-sensing instrument comprising an inertial mass, resilient mass-supporting means comprising a spring device comprising two sets of elongate resilient limbs each integral at one end portion thereof with an interconnecting bridge member and said limbs being substantially coplanar and substantially parallel in the relaxed state thereof and each being intermediate the ends thereof thinner than at the free ends thereof and thinner than said bridge member, the unbridged free ends of the limbs of one set of said limbs of said spring device having means for facilitating attachment to such inertial mass and the unbridged free ends of the limbs of the other set of said limbs of said spring device being arranged to be secured to a fixed structure.

5. A miniature accelerometer comprising:
first means, including frame means, constructed and arranged to be subjected to acceleration in each of first and second opposite directions;
second means, comprising an inertial mass providing a cylinder, and resilient means in said second means interconnecting the mass to said first means for limited movement relative to said first means, said resilient means comprising a set of stiff plural-limbed springs constructed and arranged to support said mass and to constrain said mass to rectilinear movements relative to said first means, said springs being of a length approximately equal to the height of said inertial mass and disposed closely adjacent respective faces of the mass, whereby a minimum of space is occupied;
third means, comprising damping means for damping motion of said mass relative to said first means in both of said directions, said damping means comprising a body of damping liquid and relatively stationary piston means fixed to said frame means and operable in said cylinder and having a passage therethrough restricted by a sharp-edge orifice and constructed and arranged to accelerate a mass of said fluid through said sharp-edge orifice alternatively in either of said directions and in the same direction as that of said mass incident to movement of said mass relative to said first means; and
fourth means, comprising indicating means for providing electric signals representative of respective movements of said mass relative to said first means.

6. A miniature accelerometer comprising:
first means, including frame means, constructed and arranged to be subjected to acceleration in each of first and second opposite directions;
second means, comprising an inertial mass providing a cylinder, and resilient means in said second means interconnecting the mass to said first means for limited movement relative to said first means;
third means, comprising damping means for damping motion of said mass relative to said first means in both of said directions, said damping means comprising a body of damping liquid and relatively stationary piston means fixed to said frame means and operable in said cylinder and having a passage therethrough restricted by a sharp-edge orifice and constructed and arranged to accelerate a mass of said fluid through said sharp-edge orifice alternatively in either of said directions and in the same direction as that of said mass incident to movement of said mass relative to said first means; and
fourth means, comprising indicating means for providing electric signals representative of respective movements of said mass relative to said first means, said indicating means comprising motion-amplifying means effective to accurately amplify movements of said mass relative to said mass and to transmit the amplified movements to said indicating means for translation into corresponding electric signals, said motion-amplifying means comprising first and second elongate flexible leaf springs rigidly interconnected at their first ends and extending divergently away therefrom to their second ends, and the first of said leaf springs being connected at its second end to said mass, and the second of said leaf springs being connected at its second end to said frame means, and the said indicating means comprising an indicating device operated by the interconnected ends of said leaf springs, whereby movements of said mass are substantially linearly multiplied and translated to said indicating device.

7. A compact accelerometer comprising:
first means, comprising a base means subject to acceleration, said base means comprising first and second sets of spaced-apart mounting means;
second means, comprising a block-like inertial mass means having generally parallel end faces, said mass means comprising first and second sets of spaced-apart mounting means protruding outwardly from respective ones of said end faces;
third means, comprising first and second mass-supporting spring devices each consisting essentially of first and second spaced-apart sets of resilient elongate struts each of which struts has a free end and an opposite end integral with a bridge interconnecting the struts of the respective device, the free end of one strut of each set of struts of each of the spring devices being secured to a respective mounting means of said base means and the free end of the other strut of each set of struts of each of the spring devices being secured to a respective mounting means of said mass means, and said spring devices being of width and length approximately the same as a respective one of said end faces and being disposed closely adjacent respective ones of said end faces of said mass means and in substantially parallel relationship to each other and to said end faces, whereby said mass is constrained to rectilinear movements of very small amplitude in either of opposite directions relative to said base means;
fourth means, comprising dashpot means for damping movements of said mass means relative to the base means in each of first and second opposite directions, said dashpot means comprising an apertured piston means having means forming a sharp-edge orifice in the aperture thereof and said piston means being affixed to said base means and extending between the spaced-apart sets of struts of one of said spring devices and into a cylindrical cavity formed in said mass means, said fourth means comprising damping liquid disposed for acceleration alternatively in either of said opposite directions through the aperture of the piston incident to said movements;
and fifth means, comprising indicating means secured in part to said first means and in part to said second means, constructed and arranged to provide an electrical indication of the magnitude and direction of movement of said mass means relative to said base means.

8. An accelerometer according to claim 7, in which said piston means comprises means forming a longitudinally-extending tubular passage therethrough and means in said passage providing a sharp-edge orifice through which said damping fluid is constrained to be accelerated incident to occurrence of any of said motions.

9. A compact miniature accelerometer comprising:

first means, comprising a block-line inertial mass means having an internal recess;

second means, comprising base means arranged for acceleration by an applied force;

third means, comprising first and second integral spring devices disposed at responsive ones of opposite faces of said mass means and constructed and arranged to support said mass means and constrain the latter to rectilinear movements relative to said base means, the first of said spring devices comprising first and second spaced-apart sets of elongate struts interconnected by and integral with a bridging portion, each set of struts comprising two struts and one strut of each set thereof being affixed at its free end to said mass means and another strut of each set thereof being affixed at its free end to said base means;

fourth means, comprising a movable indicator device comprising first and second elongate flexible leaf springs and a bridging member rigidly interconnecting the leaf springs adjacent one end thereof and said leaf springs having respective free ends, the free end of the first of said leaf springs being connected to said mass means within the said internal recess and the free end of the second of said leaf springs being affixed to said second means and said indicator device extending outwardly from the interior of said mass means between said spaced-apart sets of struts, whereby rectilinear movements of said mass means induce amplified transverse movements of the interconnected ends of said leaf springs, and whereby the space required for said first, second, third and fourth means is minimized;

and fifth means, comprising electrical means cooperating with said indicator device to provide therewith electrical indications of said movements.

10. An accelerometer according to claim 9, comprising movement-damping means for damping motions of said mass means, said damping means comprising a confined body of damping liquid at least a portion of which is confined in a cylinder provided in said mass means, and a piston means secured to said second means and extending therefrom between said spaced-apart sets of struts and into the cylinder, said piston having a passage therethrough for passage of damping liquid therethrough incident to said movements.

11. An accelerometer according to claim 10, including cooperating stop means affixed in part to said first means and affixed in part to said second means, effective to restrict said movements to very small excursions.

References Cited by the Examiner

UNITED STATES PATENTS

| | | | |
|---|---|---|---|
| 1,943,850 | 1/1934 | Truman | 73—514 X |
| 2,054,466 | 9/1936 | Peo | 188—89 |
| 2,067,281 | 1/1937 | Padgett | 188—89 |
| 2,702,186 | 2/1955 | Head | 73—517 |
| 2,945,378 | 7/1960 | Martin | 73—516 |
| 2,959,459 | 11/1960 | Ryan | 73—516 |
| 2,997,678 | 8/1961 | Gibbs | 73—516 |
| 3,010,324 | 11/1961 | Pitzer | 73—516 |
| 3,057,209 | 10/1962 | Frank | 73—157 |

FOREIGN PATENTS

| | | |
|---|---|---|
| 753,409 | 8/1933 | France. |

RICHARD C. QUEISSER, *Primary Examiner.*

SAMUEL LEVINE, ROBERT EVANS, JOSEPH P. STRIZAK, *Examiners.*

J. J. GILL, *Assistant Examiner.*